United States Patent
Shields et al.

(10) Patent No.: US 11,449,186 B2
(45) Date of Patent: Sep. 20, 2022

(54) SYSTEM AND METHOD FOR OPTIMIZED GENERATION OF A SINGLE PAGE APPLICATION FOR MULTI-PAGE APPLICATIONS

(71) Applicant: Cognizant Technology Solutions India Pvt. Ltd., Chennai (IN)

(72) Inventors: Alex Shields, Tempe, AZ (US); Ashwin Kumar, Chandler, AZ (US); Adrienne Dewitt, Gilbert, AZ (US); Marty Newton, Chandler, AZ (US); Derrick Drewry, Chandler, AZ (US); Mark Alan Phillips, Mesa, AZ (US)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 129 days.

(21) Appl. No.: 16/916,715

(22) Filed: Jun. 30, 2020

(65) Prior Publication Data

US 2021/0405826 A1 Dec. 30, 2021

(51) Int. Cl.
*G06F 3/0481* (2022.01)
*G06F 40/143* (2020.01)
*G06F 8/38* (2018.01)

(52) U.S. Cl.
CPC .............. *G06F 3/0481* (2013.01); *G06F 8/38* (2013.01); *G06F 40/143* (2020.01)

(58) Field of Classification Search
CPC ......... G06F 3/0481; G06F 8/38; G06F 40/143
See application file for complete search history.

(56) References Cited

U.S. PATENT DOCUMENTS 7,174,383 B1 * 2/2007 Biswas ............... H04L 63/0815
709/229
7,523,401 B1 * 4/2009 Aldridge ............... G06F 16/958
715/760

(Continued)

OTHER PUBLICATIONS

Pitale, Tony, "Using JAVASCRIPT PostMessage to Talk to iFrames," retrieved on Dec. 29, 2021 from https://www.viget.com/articles/using-javascript-postmessage-to-talk-to-iframes, , published on Jul. 5, 2011. (Year: 2011).*

(Continued)

*Primary Examiner* — Eric J. Bycer
(74) *Attorney, Agent, or Firm* — Cantor Colburn LLP

(57) ABSTRACT

A system and method for optimized generation of a single page application for multi-page applications is provided. A shell application is fetched for hosting a user interface (UI) associated with one or more child applications. The shell application is associated with multiple pre-defined frames. The shell application maintains a bi-directional communication with the child application until the UI associated with the child application remains hosted in the shell application. Further, UI extensions associated with the UI of the child applications are fetched. The UI extensions are in the form of one or more pre-defined UI visualization formats. Each of the fetched UI extensions are discrete UI extensions functioning independently of the other. Lastly, the UI extensions are deployed in the pre-defined frames associated with the shell application to generate a single page application.

28 Claims, 4 Drawing Sheets

(56) References Cited

U.S. PATENT DOCUMENTS

| | | | |
|---|---|---|---|
| 2015/0019991 A1* | 1/2015 | Kristjánsson | H04L 41/0853 715/747 |
| 2015/0052498 A1* | 2/2015 | Chauhan | G06F 8/38 717/109 |
| 2016/0188546 A1* | 6/2016 | Gavriel | G06F 3/0481 715/760 |
| 2017/0034306 A1* | 2/2017 | Thangeswaran | H04L 67/42 |
| 2018/0046602 A1* | 2/2018 | Sisson | G06F 16/972 |
| 2018/0219854 A1* | 8/2018 | Miran | H04L 63/168 |
| 2019/0065016 A1* | 2/2019 | Vasudev | G06F 16/2379 |
| 2019/0108598 A1* | 4/2019 | Lai | G06Q 50/01 |
| 2020/0285516 A1* | 9/2020 | Darling | G06F 9/505 |
| 2021/0096853 A1* | 4/2021 | Aubert | G06F 8/71 |

OTHER PUBLICATIONS

Locke, Peter, Getting Token Authentication Right in a Stateless Single Page Application, from https://medium.com/lightrail/getting-token-authetication-right-in-a-stateless-single-page-application-57d0c6474e3, published on Jul. 7, 2017. (Year: 2017).*

Ezell, Will, "What is a Single Page Application? (And Should You Use One?)," retrieved on Dec. 29, 2021, from htttps://dotcms.com/blog/post/what-is-a-single-page-applicaiton-and-should-you-use-one, published on Jan. 10, 2018. (Year: 2018).*

Bodrov-Krukowski, Ilya, "ANGULAR Introduction: What It Is, and Why You Should Use It," retrieved on Dec. 29, 2021, from https://www.sitepoint.com/angular-introduction, published on Mar. 22, 2018. (Year: 2018).*

Anonymous, "WTF is ECMAScriptand how is it different from JAVASCRIPT," retrieved on Dec. 29, 2021, from https://gomakethings.com/wtf-is-ecmascript-and-how-is-it-different-from-javascript, published on Feb. 15, 2019. (Year: 2019).*

Merrill, Cache, "ANGULAR explained: Everything you need to know about ANGULAR," retrieved on Dec. 29, 2021, from https://www.zibtek.com/blog/everything-you-need-to-know-about-angular (reader mode), published on May 3, 2019. (Year: 2019).*

Schulte, Jan, "Single page Applications: Everything You Need to Know," retrieved on Dec. 29, 2021, from https://www.magnolia-cms.com/blog/all-about-single-page-applications.html (reader mode), published on Jul. 5, 2019. (Year: 2019).*

Pawel, "What are Single Page Applications(SPA)?" retrieved on Dec. 29, 2021, from https://dev.to./kendyl93/what-are-single-page-applicasions-spa-32bh, published on Sep. 15, 2019. (Year: 2019).*

* cited by examiner

SYSTEM AND METHOD FOR OPTIMIZED GENERATION OF A SINGLE PAGE APPLICATION FOR MULTI-PAGE APPLICATIONS

FIELD OF THE INVENTION

The present invention relates generally to the field of accessing applications via user interface, and more particularly the present invention relates to a system and a method for optimized generation of a single page application for multi-page applications by integrating multiple user interfaces of an application into a single user interface.

BACKGROUND OF THE INVENTION

Typically, the users (e.g. end-users) accessing an application associated with an industry or domain have to navigate to multiple functionalities and options within the application, other applications, a website, shared drives etc. for retrieving required information and data associated with a pre-defined task. Therefore, users have to access a new user interface (UI) each time while navigating multiple functionalities and options associated with the application. It has been observed that accessing multiple UI while navigating multiple functionalities and options within the application makes the operation of existing applications slow and time consuming.

Further, it has been observed that the applications rendering multiple UI while navigating multiple functionalities and options within the application renders multiple levels of UI associated with each function and option present in the application, which makes the application and application UI bulky and complex. Further, it has been observed that traditionally applications does not provide options for personalizing the application associated with the industry or domain, application UI, other applications and systems according to particular needs and requirements of the users, thereby making the functionalities and options accessibility ineffective, inefficient and expensive. Furthermore, different divisions within the industry or domain may develop and maintain multiple similar applications and associated application UIs with different functionalities and options. However, the existing systems do not provide capability for unifying such similar multiple applications and application UIs.

In light of the above drawbacks, there is a need for a system and a method which provides optimized generation of a single page application for multi-page applications. There is a need for a system and a method which provides for making operation of the existing applications fast and less time consuming. There is a need for a system and a method which provides for making the existing applications and application UI less bulky and less complex. Further, there is a need for a system and a method which provides for personalizing the application, application UI, other applications and systems according to needs and requirements of the users. Furthermore, there is a need for a system and a method which provides for more effective and inexpensive accessibility of the functionalities and options associated with the application. Yet further, there is a need for a system and a method which provides for unifying similar multiple applications and associated application interfaces.

SUMMARY OF THE INVENTION

In various embodiments of the present invention, a system for optimized generation of a single page application for multi-page applications is provides. The system comprises a memory storing program instructions, a processor configured to execute instructions stored in the memory and an application computation engine executed by the processor. The application computation engine is configured to fetch a shell application for hosting a user interface (UI) associated with one or more child applications. The shell application is associated with multiple pre-defined frames. The shell application maintains a bi-directional communication with the child application until the UI associated with the child application remains hosted in the shell application. The application computation engine is further configured to fetch UI extensions associated with the UI of the child applications. The UI extensions are in the form of one or more pre-defined UI visualization formats. Each of the fetched UI extensions are discrete UI extensions functioning independently of the other. Lastly, the application computation engine is configured to deploy the UI extensions in the pre-defined frames associated with the shell application to generate a single page application.

In various embodiments of the present invention, a method for optimized generation of a single page application for multi-page applications is provided. The method is implemented by a processor executing instructions stored in a memory. The method comprises fetching a shell application for hosting a user interface (UI) associated with one or more child applications. The shell application is associated with multiple pre-defined frames. The shell application maintains a bi-directional communication with the child application until the UI associated with the child application remains hosted in the shell application. The method further comprises fetching UI extensions associated with the UI of the child applications. The UI extensions are in the form of one or more pre-defined UI visualization formats. Each of the fetched UI extensions are discrete UI extensions functioning independently of the other. Lastly, the method comprises deploying the UI extensions in the pre-defined frames associated with the shell application to generate a single page application.

In various embodiments of the present invention, computer program product is provided. The computer program product comprises a non-transitory computer-readable medium having computer-readable program code stored thereon, the computer-readable program code comprising instructions, that when executed by a processor, cause the processor to fetch a shell application for hosting a user interface (UI) associated with one or more child applications. The shell application is associated with multiple pre-defined frames. The shell application maintains a bi-directional communication with the child application until the UI associated with the child application remains hosted in the shell application. Further, UI extensions associated with the UI of the child applications are fetched. The UI extensions are in the form of one or more pre-defined UI visualization formats. Each of the fetched UI extensions are discrete UI extensions functioning independently of the other. Lastly, the UI extensions are deployed in the pre-defined frames associated with the shell application to generate a single page application.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

Figure 1:
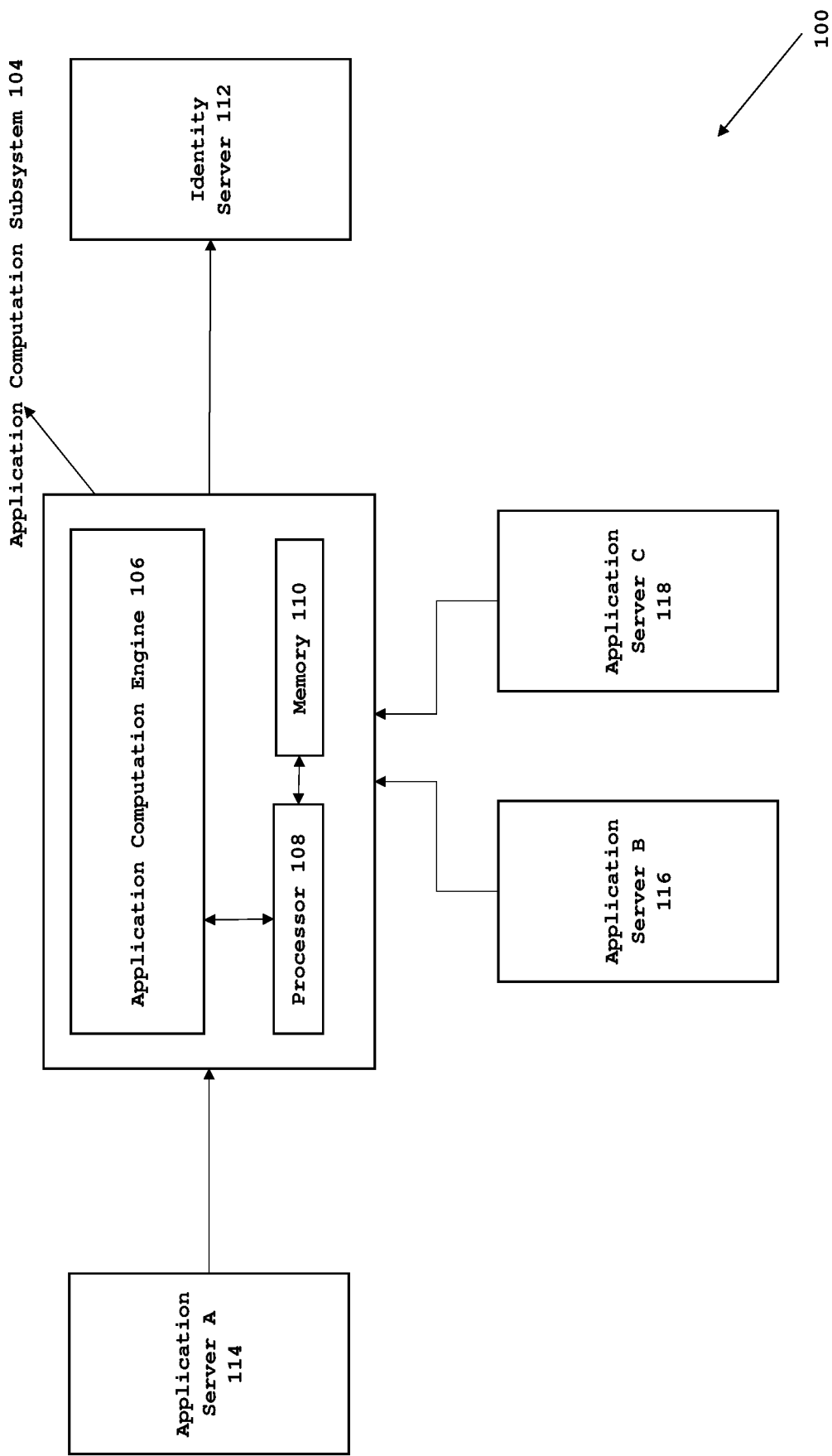
FIG. 1 is a detailed block diagram of a system for optimized generation of a single page application for multi-page applications and FIG. 1A illustrates an integrated UI representing single page application generation corresponding to multiple UIs of a child application, in accordance with an embodiment of the present invention.

The present invention discloses a system and a method for optimized generation of a single page application for multi-page applications. In particular, the present invention provides for integrating multiple user interfaces of an application into a single user interface. The present invention provides for operating the existing applications in faster and less time consuming manner. The present invention provides for making the existing applications and application UI less bulky and less complex. Further, the present invention provides for personalizing the application, application UI, other applications and systems according to needs and requirements of the users. The techniques used for personalization may include, but are not limited to, content management, layout management and theme management. The content management may include, but is not limited to, adding content which is relevant and removing content which is not relevant and aggregate data from multiple data sources into single visual experience. The layout management may include, but is not limited to, modifying the dimensions and positioning format of the content for optimal viewing capabilities. The theme management may include, but is not limited to, modifying the user interface (UI) based on color, naming, etc. Furthermore, the present invention provides for effective and inexpensive accessibility of the functionalities and options associated with the application. For instance, a user can complete the activity within a workspace without having to navigate away from the workspace. For example, a user in a single pane dashboard view may retrieve a patient's information from multiple systems, therefore the present invention allows the user to use the workspace to make necessary changes to the patient's records, if needed. Furthermore, the present invention provides for a system and a method for unifying similar multiple applications and the associated application interfaces.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

FIG. 1 is a detailed block diagram of a system 100 for optimized generation of a single page application for multi-page applications, in accordance with an embodiment of the present invention. Referring to FIG. 1, the system 100 comprises an application computation subsystem 104, an identity server 112, an application server A 114, an application server B 116 and an application server C 118.

In an exemplary embodiment of the present invention, the system 100 may be implemented in a cloud computing architecture in which data, applications, services, and other resources are stored and delivered through shared datacenters. In an exemplary embodiment of the present invention, the functionalities of the system 100 are delivered to a user as software as a service (SaaS) over a communication network.

In another exemplary embodiment of the present invention, the system 100 may be implemented as a client-server architecture. In said embodiment of the present invention, a client terminal accesses a server hosting the system 100 over a communication network. The client terminals may include, but are not limited to, a smart phone, a computer, a tablet, microcomputer or any other wired or wireless terminal. The server may be a centralized or a decentralized server.

In an embodiment of the present invention, the application computation subsystem 104 comprises an application computation engine 106, a processor 108 and a memory 110. The application computation engine 106 is operated via the processor 108 specifically programmed to execute instructions stored in the memory 110 for executing respective functionalities of the application computation engine 106 in accordance with an embodiment of the present invention. In an exemplary embodiment of the present invention, the application computation subsystem 104 comprises a user interface (UI) device associated with a user (e.g. end-user) via which the user may access and subsequently operate the applications. The applications may be associated with an industry or a domain such as, but is not limited to, healthcare, insurance, marketing, engineering, information technology (IT) solutions, telecommunications, pharmaceuticals, retail etc. The applications may include, but is not limited to, a web application etc. The user may access and operate multiple applications associated with a particular industry or domain. Further, the user interface device is capable of providing a graphical user interface (GUI), an application programming interface (API) etc. for accessing and operating an application. The UI device may include, but is not limited to, a computer system, a laptop, a tablet, a smartphone etc.

In an embodiment of the present invention, the application computation engine 106 is configured to render the applications as a single page application (SPA) by operating in conjunction with the application server A 114, the application server B 116 and the application server C 118. The application server A 114, the application server B 116 and the application server C 118 may be positioned at a location local or remote to the application computation subsystem 104. The application server A 114, the application server B 116 and the application server C 118 may include, but is not limited to, docker container, kubernetes, internet information services (IIS) on windows server and shared hosting services. Further, the user communicates with the application computation subsystem 104 and subsequently invokes the application computation subsystem 104 on the UI device for accessing and operating the application associated with an industry or domain.

In an embodiment of the present invention, the application computation engine 106 is firstly configured to communicate with the application server A 114, when the user invokes the application computation subsystem 104 for accessing and operating an application. The application server A 114 is configured with multiple applications associated with different industries or domains. The multiple applications may include, but are not limited to, 'shell' applications. The shell application is representative of a host application which is in the form of a SPA and is configured to host an associated child application. A single shell application hosts multiple child applications. Therefore, the shell application hosts the child applications and manages the interaction between each child application and other applications.

In an embodiment of the present invention, the application computation engine 106 communicates with the application server A 114 for fetching the shell application. The shell application is associated with a UI. The UI associated with the shell application is constructed based on the computer programming languages such as, but are not limited to, JavaScript (js®), dynamic hypertext markup language (HTML®), cascading style sheets (css®) etc. The UI of the shell application is constructed in a browser associated with the application computation engine 106. The browser parses the computer programming language for constructing the UI associated with the shell application, which is subsequently rendered in the browser.

The shell application is configured to render the UI associated with the child application and control the rendering of the UI associated with the child application via the browser on the application computation engine 106. For example, if the browser is google chrome®, internet explorer®, etc., then the shell application renders the UI for the child application in the browser as top bar, navigation menu at the top, administrative screens etc. The shell application is configured to provide multiple pre-defined frames for hosting the UI associated with the child application as a SPA. The UI constructed and rendered in the browser is associated with one or more universal resource locators (URLs), which are used by the shell application for providing multiple pre-defined frames for hosting the UI associated with the child application. Further, in operation, the child applications communicate with the shell application via the browser's PostMessage API and thereafter, the shell application uses the said communication for maintaining a bi-directional communication channel with the child application, in order to facilitate the communication with the child application until the UI associated with the child application remains hosted in the shell application.

In an embodiment of the present invention, the application server B 116 and the application server C 118 are configured with multiple child applications. The child applications are in the form of UI extensions. The UI extensions are associated with the UI of the child applications. The UI extensions relate to various options and functionalities associated with the child application. The UI extensions further relate to a specific service of the industry or domain. For example, customer service extensions, membership/eligibility extensions, claim processing and provider management extensions, utilization management extensions, benefit management extensions, customer service management extensions, etc. The UI extensions are configured to receive messages and alerts when hosted by the shell application. For instance, when the UI extension deploys in the pre-defined frames provided by the shell application, the shell application using the browser's built-in PostMessage API provides a "callback function", which is used by the shell application to send messages and alerts to UI extensions. Further, child applications may include, but are not limited to, web applications.

In an embodiment of the present invention, the UI extensions are developed using an application development framework, such as, but is not limited to, angular® UI framework, vanilla JavaScript® etc. The UI extension developed is therefore an angular® application. The UI extensions are in the form of one or more pre-defined UI visualization formats. The pre-defined UI visualization formats may be in the form of, but are not limited to, and loads as parts in the content area of the application via the browser. The pre-defined UI visualization formats are pre-developed for the child applications which are associated with an industry or domain and subsequently stored in the application server B 116 and the application server C 118 respectively for future retrieval.

In an embodiment of the present invention, the shell application, based on one or more user inputs received by the application computation engine 106, for accessing and operating the child application, is configured to fetch and render UI extensions in the one or more pre-defined UI visualization formats on the application computation engine 106 via the browser by operating in conjunction with the application server B 116 and the application server C 118. The application server B 116 and the application server C 118 provides the capability of interfacing with different sources for gathering data and presenting in a consolidated format within each UI extension. In an exemplary embodiment of the present invention, the fetched UI extensions are rendered as individual routable web applications by the application computation engine 106, which are fetched from the application server B 116 and the application server C 118. Therefore, each UI extension is a discrete UI extension and configured to render and operate independently with respect to each other. Further, the UI extensions are not dependent on the rendered content, data source, user interactions, alerts, etc. from other UI extensions. Advantageously, absence of one UI extension does not prevent the rendering of another UI extension.

In an embodiment of the present invention, the application server B 116 and the application server C 118, based on one or more instructions received from the shell application via the application computation engine 106, is configured to transmit the multiple UI extensions for displaying multiple functionalities and options associated with the child application. The multiple functionalities and options are displayed based on the multiple pre-defined UI visualization formats and one or more angular® routes via the browser on the application computation engine 106. In an exemplary embodiment of the present invention, the instructions received, from the shell application, by the application server B 116 and the application server C 118 for rendering the UI extensions are in the form of events. The events are, therefore, representative of user inputs received by the shell application for accessing and operating the application. The user inputs may include, but are not limited to, a search for a specific member, a user initiated permission check on the security token, opening of a blade and user timeout interactions. Further, in an exemplary embodiment of the present invention, during initialization of the UI extension, the UI extension may use JavaScript® in order to receive events provided by the shell application and subsequently communicate certain pre-defined parameters associated with the events. The pre-defined parameters are used by the UI extension to represent data.

In operation, the UI extensions respond to events by fetching data, which is relevant to the pre-defined parameters associated with the event, from the application server B 116 and the application server C 118 and provide the fetched UI extension to the user on the application computation engine 106 via the browser. Further, the application server B 116 and the application server C 118 is configured to respond to the event communications received from the shell application by providing appropriate UI extension in a pre-defined UI visualization format. The communication between the application server B 116 and the application server C 118 and the shell application at the application computation engine 106 end is carried out via a JavaScript® library provided by shell software development kit (SDK). The JavaScript® library further utilizes the browser's PostMessage API to communicate events between the application server B 116 and the application server C 118 and the shell application at the application computation engine 106 end for fetching the appropriate UI extensions.

Figure 1A:
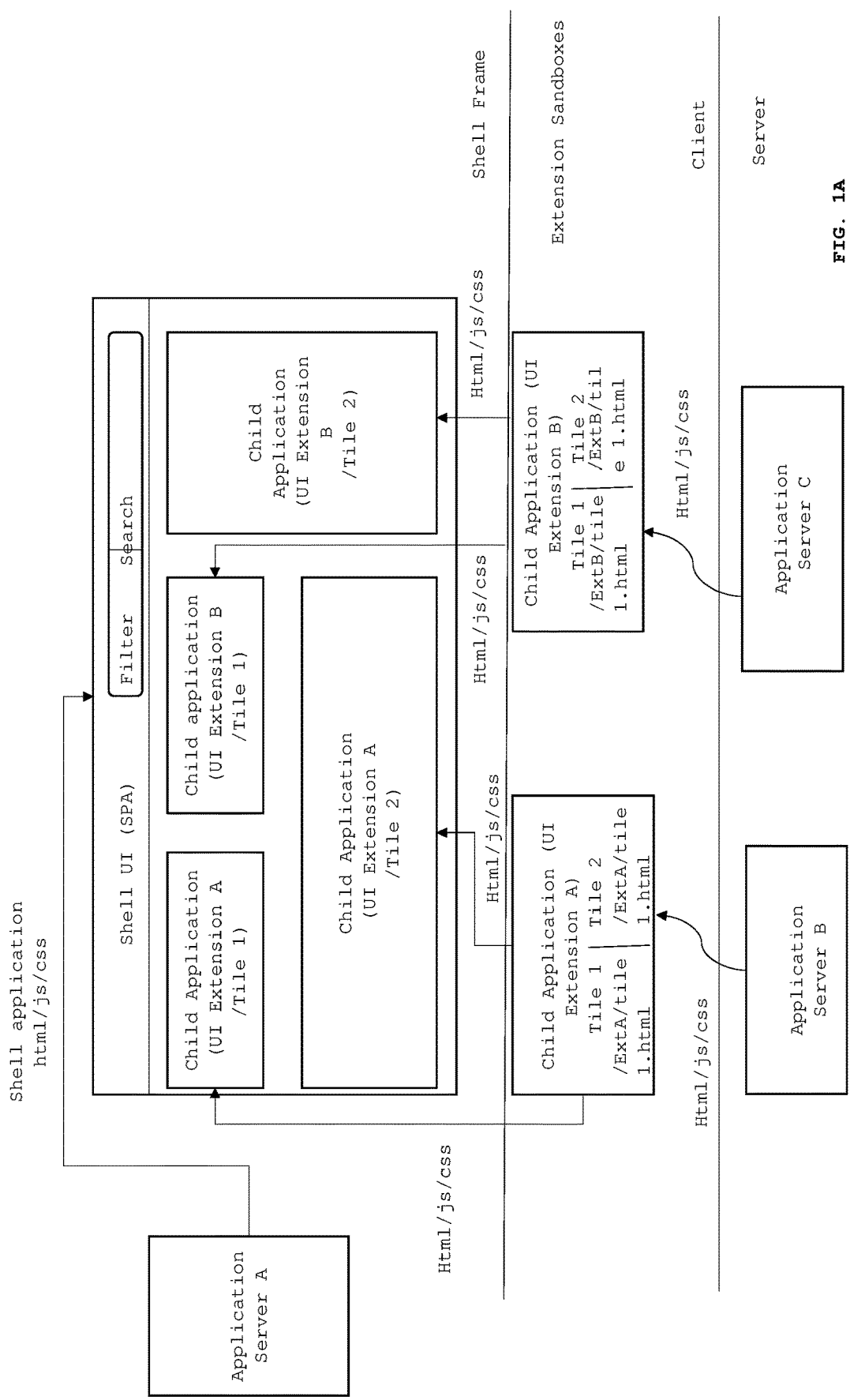

In an embodiment of the present invention, the application computation engine 106 is configured to deploy the UI of the UI extensions, fetched from the application server B 116 and the application server C 118, into the one or more pre-defined frames associated with the shell application for rendering the child application as a SPA. As shown in FIG. 1A, an integrated UI representing the SPA is created based on UI extensions (in the form of pre-defined visualization formats) of one or more child applications deployed in multiple frames of the constructed UI of the shell application. The pre-defined frame aids to embed 'external webpages' into the shell application. Further, the shell application, via the application computation engine 106, deploys only particular UI extension's UI, which are rendered into the pre-defined UI visualization format. In another embodiment of the present invention, the UI extensions UIs are deployed from one or more universal resource locators (URLs) registered with the shell application.

In an embodiment of the present invention, the application computation engine 106 is configured to communicate with the identity server 112, when a user via the UI device sends a request for accessing and operating the child application. The identity server 112 may be positioned at a location local to the application computation subsystem 104 or remote to the application computation subsystem 104.

In an embodiment of the present invention, the identity server 112 operating in conjunction with the application computation engine 106 is configured to authenticate a user, when a user via the UI device sends a request for accessing and operating the child application and subsequently authorizes the user for accessing and operating the child application. The application computation engine 106 communicating with the application server A 114, the application server B 116 and the application server C 118 renders the requested application as a SPA. The identity server 112 authenticates the user and provides access to the SPAs based on generating a set of tokens such as, but are not limited to, identity tokens and application access tokens. In an exemplary embodiment of the present invention, the identity tokens and the application access tokens are generated based on pre-defined set of rules, when a request is sent by the application computation engine 106 to the identity server 112 for accessing the child application. The pre-defined set of rules are registered with the identity server 112. The pre-defined set of rules are associated with certain factors based on which the tokens are generated. The factors may include, but are not limited to, a unique ID, a secret value, a grant type, a redirect universal resource identifier (URI) and a list of resources which the pre-defined set of rules may access.

In an exemplary embodiment of the present invention, the identity data associated with the user and the application accessing data is pre-stored in the identity server 112. The user's identity data may include, but is not limited to, name, email address, family name etc. The user is registered prior to accessing the child applications and is further associated with a unique identifier. The application access data is utilized for generating application access tokens, which may include, but is not limited to, unique ID, unique API name, and API data. The identity tokens are configured to provide an identifier associated with the user and further provides information regarding the process utilized for authenticating the user and the time when the user was authenticated. Further, the application access tokens are configured to provide authorization for accessing the child applications. In an embodiment of the present invention, a new set of tokens is generated each time a new extension is rendered. In another embodiment of the present invention, a new set of tokens is generated, after a previous set of tokens becomes non-functional. Further, tokens enable the shell application to provide "single sign-on", which aids the UI extensions to initialize user identity and acquire tokens without presenting multiple login screens.

Advantageously, in accordance with various embodiments of the present invention, the system 100 is configured to efficiently generate a single page application for multi-page applications by effectively integrating multiple user interfaces of an application into a single user interface. The system 100 is fast and less time consuming with regard to the rendering of application on the UI of the user device. The system 100 is configured to provide a less bulky and easy UI based utilizing various UI extensions fetched from various application extension servers. Further, the system 100 is configured to provide capability of personalizing the UI and utilizing only such functionalities and option associated with users needs and requirements. Furthermore, the system 100 is configured to provide for unifying similar multiple applications and the associated application interfaces based on gathering data from multiple application sources for transforming and rendering within a singular visual application which may be personalized when multiple application sources typically has no relational reference to each other.

Figure 2:
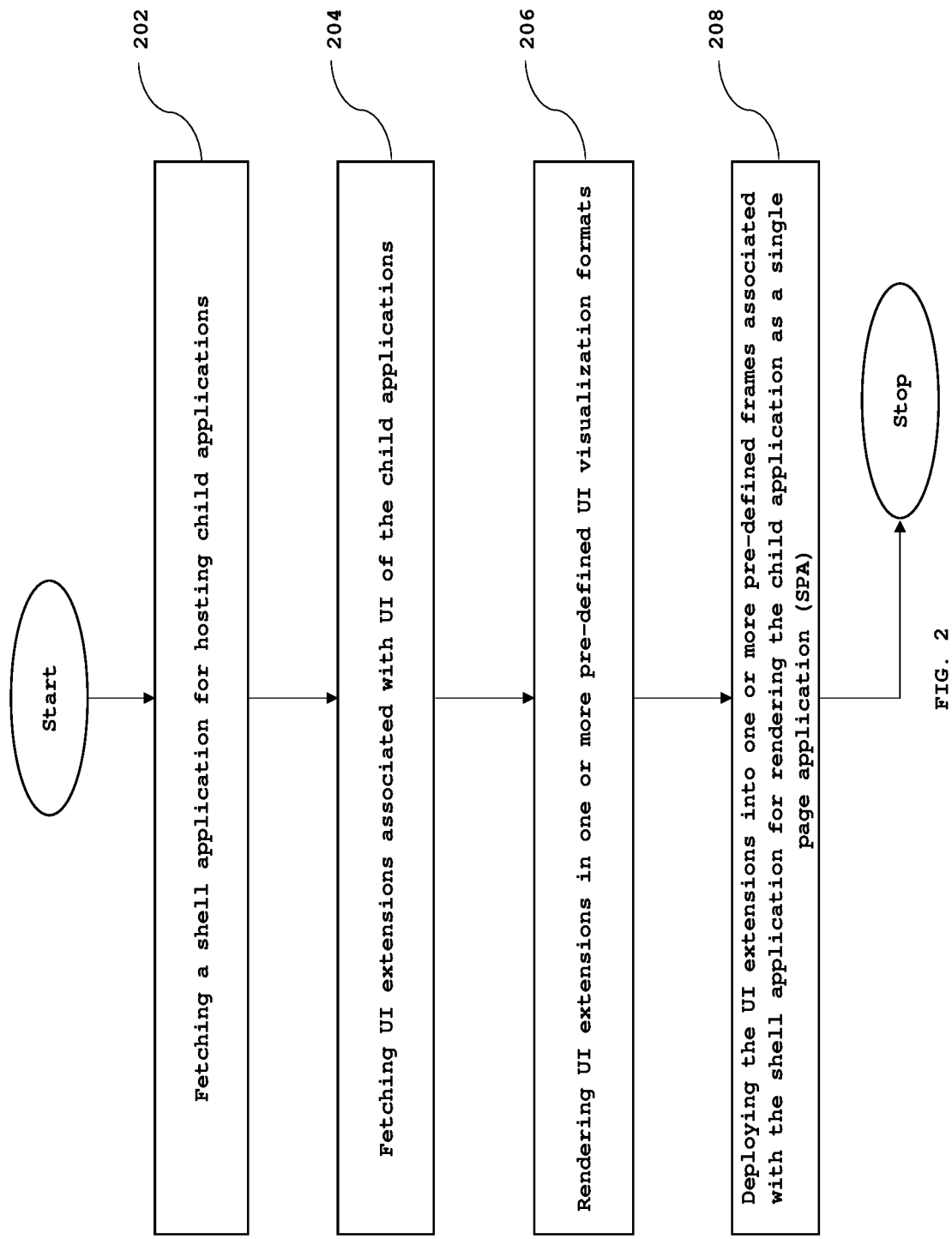
FIG. 2 is a flowchart illustrating a method for optimized generation of a single page application for multi-page applications, in accordance with an embodiment of the present invention.

FIG. 2 is a flowchart illustrating a method for optimized generation of a single page application for multi-page applications, in accordance with various embodiments of the present invention.

At step 202, a shell application is fetched for hosting child applications. In an embodiment of the present invention, the shell application is representative of a host application which is in the form of a single page application (SPA) and is configured to host an associated child application. A single shell application hosts multiple child applications. Therefore, the shell application hosts the child applications and manages the interaction between each child application and other applications. The shell application is associated with a UI. The UI associated with the shell application is constructed based on the computer programming languages such as, but are not limited to, JavaScript (js®), dynamic hypertext markup language (HTML®), cascading style sheets (css®) etc. The UI of the shell application is constructed in a browser. The browser parses the computer programming language for constructing the UI associated with the shell application, which is subsequently rendered in the browser.

The shell application is configured to render the UI associated with the child application and control rendering of the UI associated with the child application via the browser. For example, if the browser is google chrome®, internet explorer®, etc., then the shell application renders the UI for the child application in the browser as top bar, navigation menu at the top, administrative screens etc. The UI constructed and rendered in the browser is associated with one or more universal resource locators (URLs), which are used by the shell application for providing multiple pre-defined frames for hosting the UI associated with the child application. Further, in operation, the child applications communicate with the shell application via the browser's PostMessage API and thereafter, the shell application uses the said communication for maintaining a bi-directional communication channel with the child application, in order to facilitate the communication with the child application until the UI associated with the child application remains hosted in the shell application.

At step 204, UI extensions associated with UI of the child applications are fetched. In an embodiment of the present invention, the child applications are in the form of UI extensions. The UI extensions associated with the UI of the child applications. The UI extensions relate to various options and functionalities associated with the child application. The UI extensions further relate to a specific service of the industry or domain. For example, customer service extensions, membership/eligibility extensions, claim processing and provider management extensions, utilization management extensions, benefit management extensions, customer service management extensions, etc. The UI extensions are configured to receive messages and alerts when hosted by the shell application. For instance, when the UI extension deploys in the pre-defined frames provided by the shell application, the shell application using the browser's built-in PostMessage API provides a "callback function", which is used by the shell application to send messages and alerts to UI extensions. Further, child applications may include, but are not limited to, web applications.

In an embodiment of the present invention, the UI extensions are developed using an application development framework, such as, but is not limited to, angular® UI framework, vanilla JavaScript® etc. The UI extension developed is therefore an angular® application. The UI associated with the UI extensions are in the form of one or more pre-defined UI visualization formats. The pre-defined UI visualization formats may be in the form of, but are not limited to, blades which represents application pages or windows, tiles which represents content rectangles and loads as parts in the content area of the application via the browser. The pre-defined UI visualization formats are pre-developed for the child applications which are associated with an industry or domain and subsequently stored in the application server B and the application server C respectively for future retrieval.

At step 206, UI extensions are rendered in one or more pre-defined UI visualization formats. In an embodiment of the present invention, the shell application, based on one or more user inputs received, for accessing and operating the child application, is configured to fetch and render the UI extensions in the one or more pre-defined UI visualization formats via the browser. In an exemplary embodiment of the present invention, the fetched UI extensions are rendered as individual routable web applications, which are fetched from the application server B and the application server C. Therefore, each UI extension is a discrete UI extension and renders and operates independently with respect to each other. Further, the UI extensions are not dependent on the rendered content, data source, user interactions, alerts, etc. from other UI extensions.

In an embodiment of the present invention, based on one or more instructions received from the shell application, the multiple UI extensions are transmitted for displaying multiple functionalities and options associated with the child application. The multiple functionalities and options are displayed based on the multiple pre-defined UI visualization formats and one or more angular® routes via the browser. In an exemplary embodiment of the present invention, the instructions received, from the shell application, for rendering the UI extensions are in the form of events. The events are, therefore, representative of user inputs received by the shell application for accessing and operating the application. The user inputs may include, but are not limited to, a search for a specific member, a user initiated permission check on the security token, opening of a blade and user timeout interactions. Further, in an exemplary embodiment of the present invention, during initialization of the UI extension, the UI extension may use JavaScript® in order to receive events provided by the shell application and subsequently communicate certain pre-defined parameters associated with the events. The pre-defined parameters are used by the UI extension to represent data.

In operation, the UI extensions respond to events by fetching data, which is relevant to the pre-defined parameters associated with the event and provide the fetched UI extension to the user via the browser. Further, the event communications received from the shell application are responded and the shell application are replied to by providing appropriate UI extension in a pre-defined UI visualization format. The communication between the application server B and the application server C and the shell application is carried out via a JavaScript® library provided by shell software development kit (SDK). The JavaScript® library further utilizes the browser's PostMessage API to communicate events between the application server B and the application server C and the shell application for fetching the appropriate UI extensions.

At step 208, UI extensions are deployed into one or more pre-defined frames associated with the shell application for rendering the child application as a single page application (SPA). In an embodiment of the present invention, the UI extensions deploys its UI into the one or more pre-defined frames associated with the shell application for rendering the child application as a SPA. The pre-defined frame aids to embed 'external webpages' into the shell application. Further, the shell application deploys only particular UI extension's UI, which are rendered into the pre-defined UI visualization format. In another embodiment of the present invention, the UI extension's UIs are deployed from one or more universal resource locators (URLs) registered with the shell application.

In an embodiment of the present invention, a user is authenticated, when a user via the UI device sends a request for accessing and operating the child application and subsequently the user is authorized for accessing and operating the child application. The requested application is rendered as a SPA. The user is authenticated and provided access to the SPAs based on a set of tokens such as, but are not limited to, identity tokens and application access tokens. In an exemplary embodiment of the present invention, the identity tokens and the application access tokens are generated based on pre-defined set of rules, when a request is sent for accessing the child application. The pre-defined set of rules are associated with certain factors based on which the tokens are generated. The factors may include, but are not limited to, a unique ID, a secret value, a grant type, a redirect universal resource identifier (URI) and a list of resources which the pre-defined set of rules may access.

In an exemplary embodiment of the present invention, the identity data associated with the user and the application accessing data is pre-stored in an identity server. The user's identity data may include, but is not limited to, name, email address, family name etc. The user is registered prior to accessing the child applications and is further associated with a unique identifier. The application access data is utilized for generating application access tokens, which may include, but is not limited to, unique ID, unique API name, and API data. The identity tokens are configured to provide an identifier associated with the user and further provides information regarding the process utilized for authenticating the user and the time when the user was authenticated. Further, the application access tokens are configured to provide authorization for accessing the child applications. In an embodiment of the present invention, a new set of tokens is generated each time a new extension is rendered. In another embodiment of the present invention, a new set of tokens is generated, after a previous set of tokens becomes non-functional. Further, tokens enable the shell application to provide "single sign-on", which aids the UI extensions to initialize user identity and acquire tokens without presenting multiple login screens.

Figure 3:
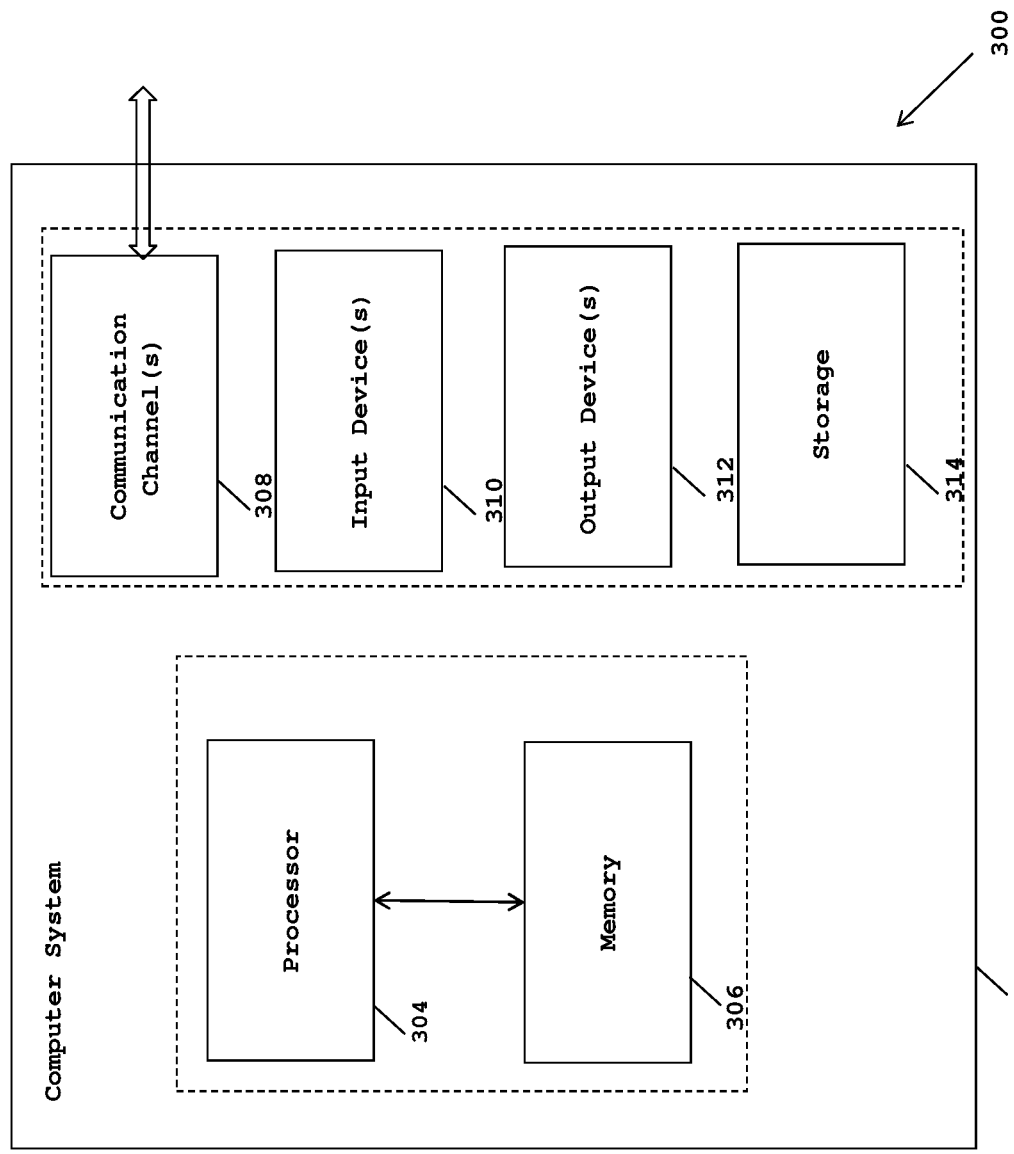
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth® or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth® or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A system for optimized generation of a single page application for multi-page applications, the system comprising:
   a memory storing program instructions;
   a processor configured to execute instructions stored in the memory; and
   an application computation engine executed by the processor and configured to: communicate with an application server to fetch a shell application and construct a user interface (UI) associated with the shell application in a browser of the application computation engine for controlling rendering of multiple UIs associated with each of a one or more child applications via the browser, wherein the shell application maintains a bi-directional communication with the one or more child applications until the UIs associated with the one or more child applications remains hosted in the shell application;

communicate with other application servers to fetch UI extensions associated with the UIs of the child applications for hosting the multiple UIs corresponding to each of the one or more child applications, wherein the UI extensions are in the form of one or more pre-defined UI visualization formats, and wherein each of the fetched UI extensions are discrete UI extensions functioning independently of the other; and deploy the UI extensions in multiple frames provided by the constructed UI associated with the shell application to create an integrated UI in place of the multiple UIs associated with each of the one or more child applications to generate a single page application for each of the one or more child applications.

2. The system as claimed in claim 1, wherein the constructed UI is associated with one or more universal resource locators (URLs) and wherein the URLs are used by the shell application for providing multiple pre-defined frames.

3. The system as claimed in claim 1, wherein the child applications communicate with the shell application via the browser's PostMessage application programing interface (API).

4. The system as claimed in claim 1, wherein the UI extensions relate to a specific service of an industry, and wherein the UI extensions comprises one or more of customer service extensions, membership or eligibility extensions, claim processing and provider management extensions, utilization management extensions, benefit management extensions and customer service management extensions.

5. The system as claimed in claim 1, wherein the UI extensions are configured to receive messages and alerts from the shell application using the browser's built-in PostMessage API.

6. The system as claimed in claim 1, wherein the pre-defined UI visualization formats comprises blades representing application pages and tiles representing content rectangles.

7. The system as claimed in claim 1, wherein the pre-defined UI visualization formats are pre-developed for the child applications and subsequently stored in an application server B and an application server C.

8. The system as claimed in claim 1, wherein the UI extensions are fetched by the shell application based on one or more user inputs received by the application computation engine for accessing and operating the child application.

9. The system as claimed in claim 1, wherein the fetched UI extensions are rendered as individual routable web applications by the application computation engine and absence of any one of the UI extensions does not prevent rendering of any one of the other UI extensions.

10. The system as claimed in claim 1, wherein an application server B and an application server C, based on one or more instructions received, in the form of events, from the shell application via the application computation engine, are configured to transmit the UI extensions for displaying multiple functionalities and options associated with the child application.

11. The system as claimed in claim 1, wherein the pre-defined frames embed external webpages into the shell application.

12. The system as claimed in claim 1, wherein an identity server authenticates a user for providing access to the generated single page application corresponding to the one or more child applications based on generating a set of tokens, and wherein the tokens comprise identity tokens and application access tokens.

13. The system as claimed in claim 12, wherein the identity tokens and the application access tokens are generated based on pre-defined set of rules, when a request is sent by the application computation engine to the identity server for accessing the child application.

14. The system as claimed in claim 12, wherein a new set of tokens is generated each time a new UI extension is rendered and after a previous set of tokens becomes non-functional.

15. The system as claimed in claim 12, wherein the tokens enable the shell application to provide a "single sign-on", which aids the UI extensions to initialize user identity and acquire tokens without presenting multiple login screens.

16. A method for optimized generation of a single page application for multi-page applications, wherein the method is implemented by a processor executing instructions stored in a memory, the method comprising:

communicating with an application server for fetching a shell application and constructing a user interface (UI) associated with the shell application for controlling rendering of multiple UIs associated with each of a one or more child applications, wherein the shell application maintains a bi-directional communication with the one or more child applications until the UIs associated with the one or more child applications remains hosted in the shell application;

communicating with other application servers for fetching UI extensions associated with the UIs of the child applications for hosting the multiple UIs corresponding to each of the one or more child applications, wherein the UI extensions are in the form of one or more pre-defined UI visualization formats, and wherein each of the fetched UI extensions are discrete UI extensions functioning independently of the other; and deploying the UI extensions in multiple frames provided by the constructed UI associated with the shell application to create an integrated UI in place of the multiple UIs associated with each of the one or more child applications to generate a single page application for each of the one or more child applications.

17. The method as claimed in claim 16, wherein the UI is associated with one or more universal resource locators (URLs) and wherein the URLs are used by the shell application for providing multiple pre-defined frames.

18. The method as claimed in claim 16, wherein the child applications communicate with the shell application via the browser's PostMessage application programing interface (API).

19. The method as claimed in claim 16, wherein the UI extensions are configured to receive messages and alerts from the shell application using the browser's built-in PostMessage API.

20. The method as claimed in claim 16, wherein the pre-defined UI visualization formats comprises blades representing application pages and tiles representing content rectangles.

21. The method as claimed in claim 16, wherein the pre-defined UI visualization formats are pre-developed for the child applications.

22. The method as claimed in claim 16, wherein the UI extensions are fetched by the shell application based on one or more user inputs received by the application computation engine for accessing and operating the child application.

23. The method as claimed in claim 16, wherein the fetched UI extensions are rendered as individual routable web applications and absence of any one of the UI extensions does not prevent rendering of any one of the other UI extensions.

24. The method as claimed in claim 16, wherein based on one or more instructions received, in the form of events, from the shell application the UI extensions are transmitted for displaying multiple functionalities and options associated with the child application.

25. The method as claimed in claim 16, wherein a user is authenticated for providing access to the generated single page application corresponding to the one or more child applications by generating a set of tokens, and wherein the tokens comprise identity tokens and application access tokens.

26. The method as claimed in claim 25, wherein a new set of tokens is generated each time a new UI extension is rendered and after a previous set of tokens becomes non-functional.

27. The method as claimed in claim 25, wherein the tokens enables the shell application to provide a "single sign-on", which aids the UI extensions to initialize user identity and acquire tokens without presenting multiple login screens.

28. A computer program product comprising:
a non-transitory computer-readable medium having computer-readable program code stored thereon, the computer-readable program code comprising instructions, that when executed by a processor, cause the processor to:
communicate with an application server to fetch a shell application and construct a user interface (UI) associated with the shell application for controlling rendering of multiple UIs associated with each of a one or more child applications, wherein the shell application maintains a bi-directional communication with the one or more child applications until the UIs associated with the one or more child application remains hosted in the shell application;
communicate with other application servers to fetch UI extensions associated with the UI of the child applications for hosting the multiple UIs corresponding to each of the one or more child applications, wherein the UI extensions are in the form of one or more pre-defined UI visualization formats, and wherein each of the fetched UI extensions are discrete UI extensions functioning independently of the other; and
deploy the UI extensions in multiple frames provided by the constructed UI associated with the shell application to create an integrated UI in place of the multiple UIs associated with each of the one or more child applications to generate a single page application for each of the one or more child applications.

* * * * *